(12) United States Patent
Feldhaus

(10) Patent No.: US 9,194,367 B1
(45) Date of Patent: Nov. 24, 2015

(54) WIND TURBINE

(71) Applicant: Phil Feldhaus, Lake Village, IN (US)

(72) Inventor: Phil Feldhaus, Lake Village, IN (US)

( * ) Notice: Subject to any disclaimer, the term of this patent is extended or adjusted under 35 U.S.C. 154(b) by 0 days.

(21) Appl. No.: 14/194,636

(22) Filed: Feb. 28, 2014

Related U.S. Application Data

(63) Continuation-in-part of application No. 13/086,148, filed on Apr. 13, 2011, now abandoned.

(60) Provisional application No. 61/342,343, filed on Apr. 13, 2010.

(51) Int. Cl.
*F03D 3/06* (2006.01)

(52) U.S. Cl.
CPC ........................ *F03D 3/067* (2013.01)

(58) Field of Classification Search
USPC ............... 416/40, 41, 117; 415/4.2, 4.4, 907; 290/44, 55
See application file for complete search history.

(56) References Cited

U.S. PATENT DOCUMENTS 4,684,817 A * 8/1987 Goldwater ............... 290/55

FOREIGN PATENT DOCUMENTS

EP 331601 A2 * 9/1989

* cited by examiner

*Primary Examiner* — Christopher Verdier
*Assistant Examiner* — Justin Seabe
(74) *Attorney, Agent, or Firm* — Patent Law & Venture Group

(57) ABSTRACT

A wind turbine built on a vertical axle rotationally mounted within a base. A plurality of frame assemblies mounted to the axle in spaced apart radial positions where each frame assembly engages a plurality of vertically oriented peaked screens, the peaked screens arranged in radially directed side-by-side fixed positions. A plurality of light-weight flexible fabrics, each one of said flexible fabrics pivotally engaged adjacent to one of the peaked screens and of sufficient size for covering the peaked screen.

3 Claims, 6 Drawing Sheets

WIND TURBINE

CROSS-REFERENCE TO RELATED APPLICATIONS

This application is a non-provisional continuation-in-part application of an earlier filed non-provisional application Ser. No. 13/086,148, filed on Jun. 13, 2011, and being filed during co-pendency therewith claims date priority therefrom for common matter and is incorporated herein by reference.

BACKGROUND

The present disclosure relates to the field of wind driven turbines, i.e., wind engines. Conventionally, a wind engine is classified as a horizontal axis wind engine or a vertical axis wind engine based on the orientation of rotating axes of its vanes. For vanes of the vertical axis wind engine they are pivotally mounted in a frame. The frame is fixedly coupled to a vertical axis. Its transmission is provided near the ground. To the contrary, in the horizontal axis wind engine each vane has its horizontal axis provided above the ground by a relatively long distance Moreover, each of a plurality of vanes of a vertical axis wind engine can adapt itself to wind by providing a wide contour in a windward condition for fully taking advantage of the force of wind and thus for generating larger torque. To the contrary, each vane can adapt itself to wind by providing a narrow contour in a leeward condition for decreasing wind friction. As an end, wind's rotation on the vanes can be maximized for rotating the wind engine. As such, many power companies have spent much time and cost in research and development of commercial wind engines which almost all are vertical axis type wind engines due to the above reasons. The vertical axis wind engine comprises a plurality of vanes of flat surface each pivotally mounted near a free end of one of a plurality of arms of a star configuration. The arms are adapted to rotate in response to wind blowing over surfaces of the vanes. Also, the vanes orbit a central, vertical axis. Each vane can adapt itself to wind by providing a wide contour in a windward condition for fully taking advantage of the force of wind. To the contrary, each vane can adapt itself to wind by providing a narrow contour in a leeward condition for decreasing wind friction. In prior art wind turbines, an abrupt operation often occurs when the wind engine rotates. That is, its operation is not smooth. Further, the vanes tend to cause the wind engine to rotate intermittently due to centrifugal force. As such, the rotating speed of the wind engine may decrease greatly. And in turn, both the arms and the vertical axis rotate in a speed less than wind speed. The presently described wind turbine avoids this problem by providing very low mass vanes.

DESCRIPTION OF DRAWINGS

Like reference symbols in the various drawings indicate like elements.

DETAILED DESCRIPTION

Figure 1:
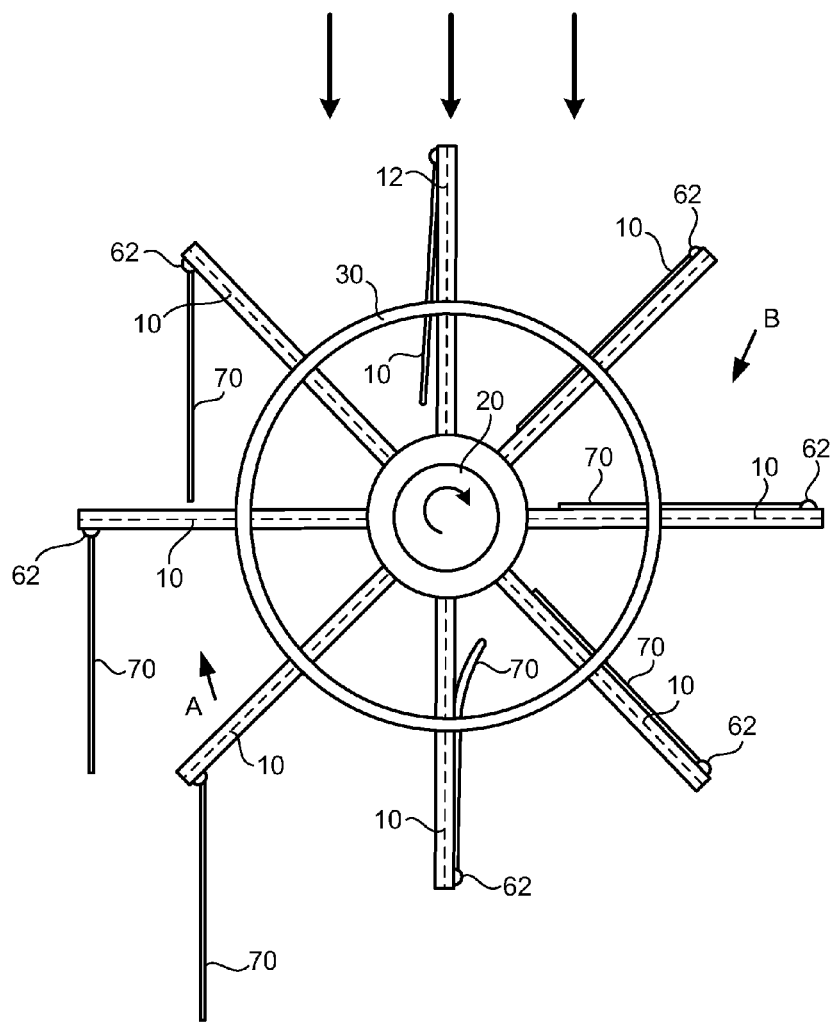
FIG. 1 is an example plan view of one embodiment of the presently described wind turbine apparatus.

FIG. 1 shows a top plan view of a driving portion of a wind turbine of a first embodiment comprising a plurality of frame assemblies 10 mounted to a vertical axle 20 in spaced apart radial positions. A rigid circular support 30 may be coaxially positioned with respect to the vertical axle 20 and engaged with struts 40 of the frame assemblies 10 to provide a rigidizing influence over the entire rotating portion of the turbine. Many other structural systems may be utilized to assure that the frame assemblies 10 are maintained in their positions.

Figure 2:
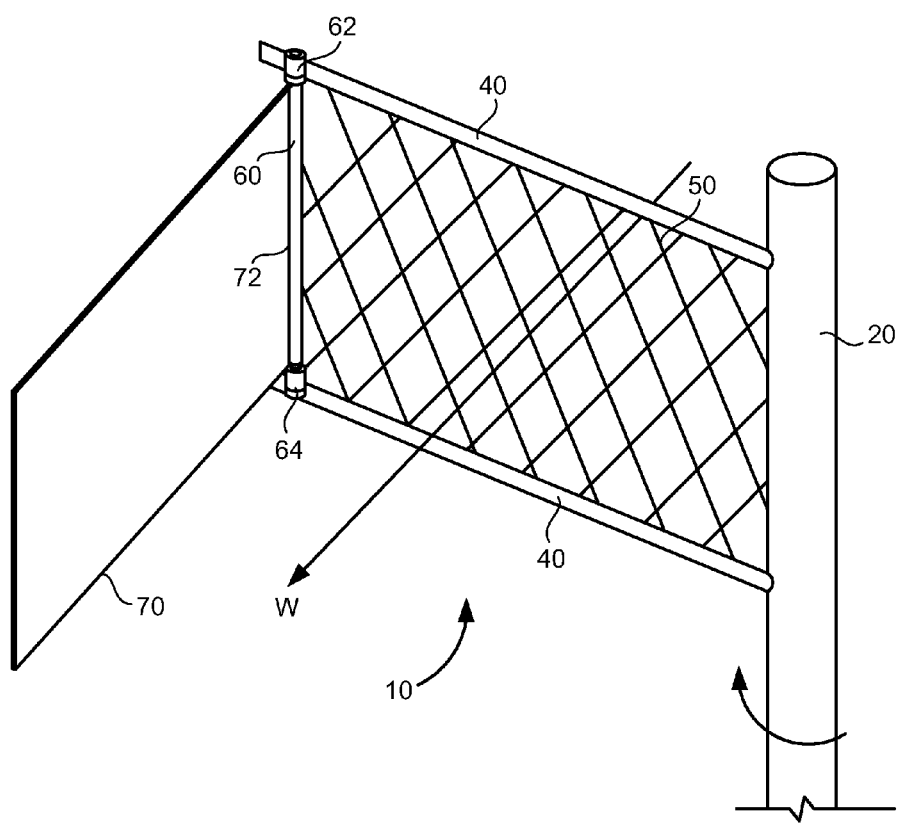
FIG. 2 is a partial perspective view thereof as seen sighting along arrow A in FIG. 1 showing one frame assembly of the turbine as mounted to a central axle.
Figure 3:
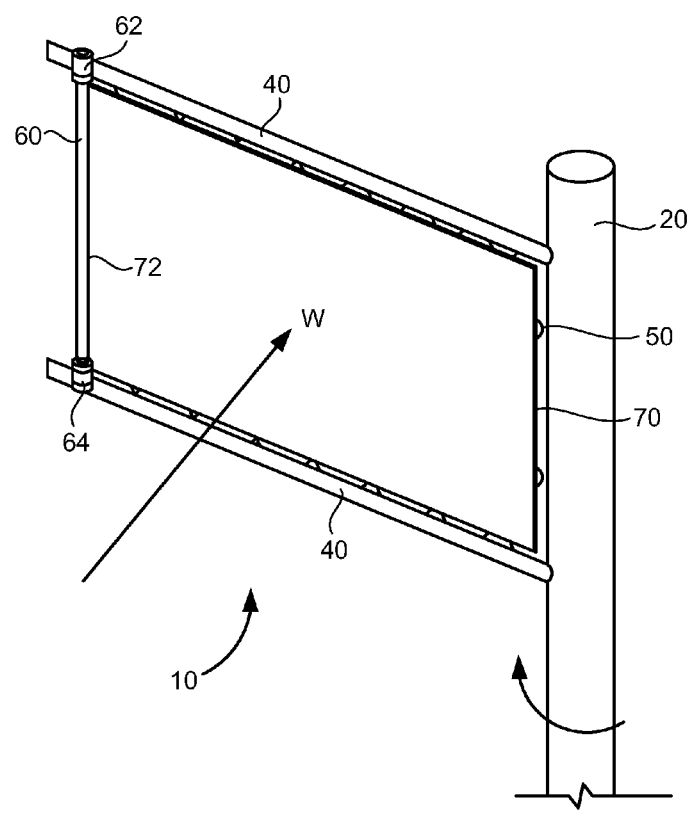
FIG. 3 is a partial perspective view thereof as seen sighting along arrow B in FIG. 1, again showing one frame assembly of the turbine as mounted to the central axle.

FIG. 2 illustrates a typical one of the frame assemblies 10 of the driving portion of the wind turbine. Each of the frame assemblies 10 has a vertically oriented flat screen 50 fixed between a pair of spaced apart struts 40, and a pivot arm 60 which is vertically oriented and rotationally mounted between the struts 40 within upper 62 and lower 64 bearings. Arm 60 may also be non-rotating. As shown, arm 60 is positioned to one side of screen 50. A flexible sheet 70 is fixedly mounted along one of its edges 72 to arm 60. The bearings 62 and 64 are attached to struts 40. As shown in FIG. 2, the screen 50 may be of the type made up of crisscross wire construction or may be of other structural wire fabric construction with relatively open weave to minimize wind drag by allowing the maximum amount of wind to flow through screen 50 with least resistance. FIG. 2 shows a frame 10 with sheet 70 positioned away from screen 50. FIG. 3 shows a frame assembly 10 with its sheet 70 pressed against screen 50.

The operation of the wind turbine embodiment described above and shown in FIGS. 1-3 is readily understood. FIG. 1 shows the direction of the wind with three heavy arrows at the twelve o'clock position in the figure. The wind force impacts the frame assemblies 10 on the right side of the turbine by pressing sheets 70 against their respective screens 50 as illustrated in FIG. 3. The sheets 70 may be a light weight and highly flexible, impermeable fabric such as plastic sheeting or other material. At the same time, the wind flowing around the left side of the turbine forces the sheets 70 away from their respective screens 50 as shown in FIG. 1. As the turbine rotates, in the present case, as shown in FIG. 1, in a clockwise direction, each frame assembly 10 moving through the 12 o'clock position receives a wind force pinning the sheet 70 of that frame assembly 10 against its screen 50. As that frame assembly 10 moves from 12 o'clock to 6 o'clock it is subject to wind forces that deliver driving forces to the turbine. At the 6 o'clock position, as shown in FIG. 1, the sheet 70 starts to be delaminated from its screen 50 by wind forces, and moves to the position shown by the other frame assemblies 10 on the left side of the turbine. Wind resistance of those frame assemblies 10 is light since the wind moves easily through the screens 50 and the sheets 70 are aligned with the wind direction so that they offer little wind resistance. In summary then, each of the frame assemblies 10 participate in generating turbine power as they move between the 12 and 6 o'clock positions and provide little wind resistance as they move between the 6 and 12 o'clock to thereby produce a clockwise rotation as viewed from above the machine.

Figure 4:
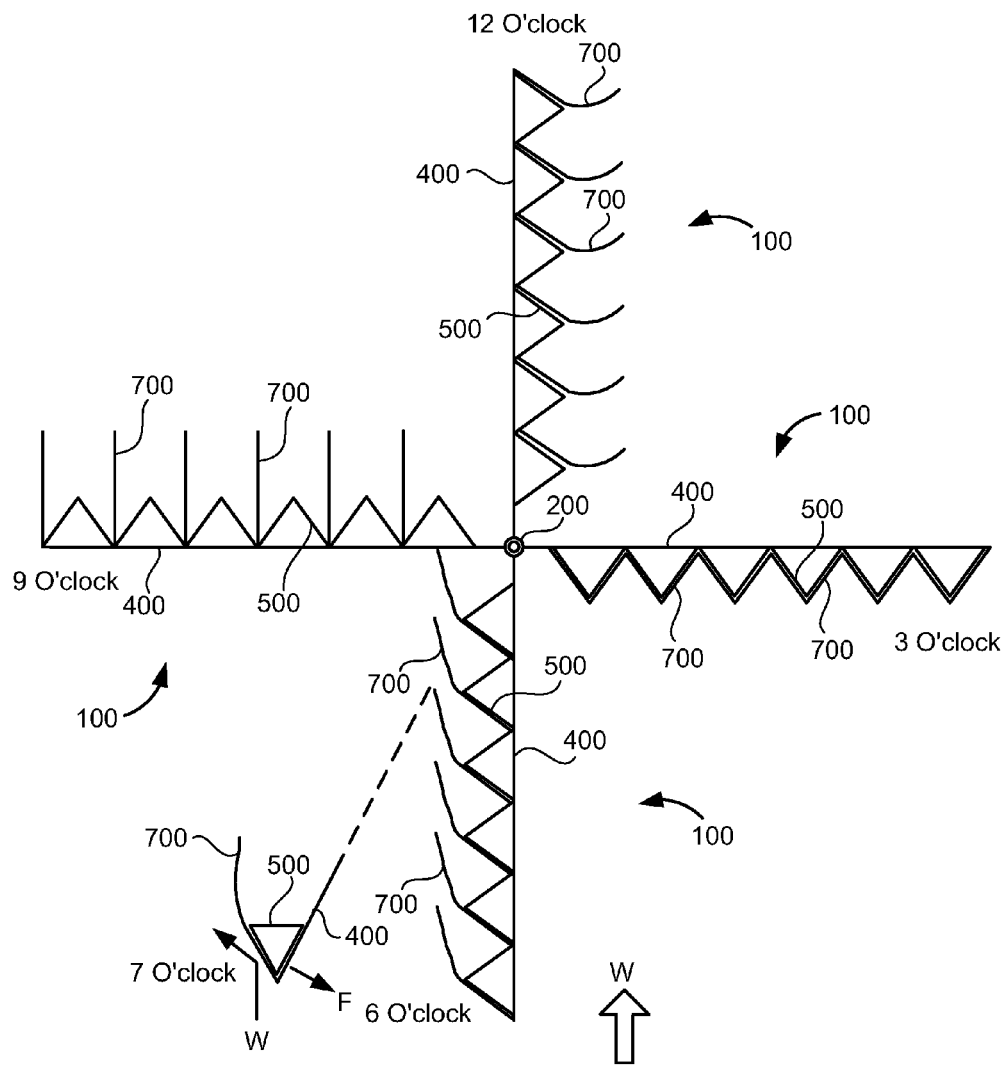
FIG. 4 is a schematic plan view of a further embodiment of the wind turbine.
Figure 5:
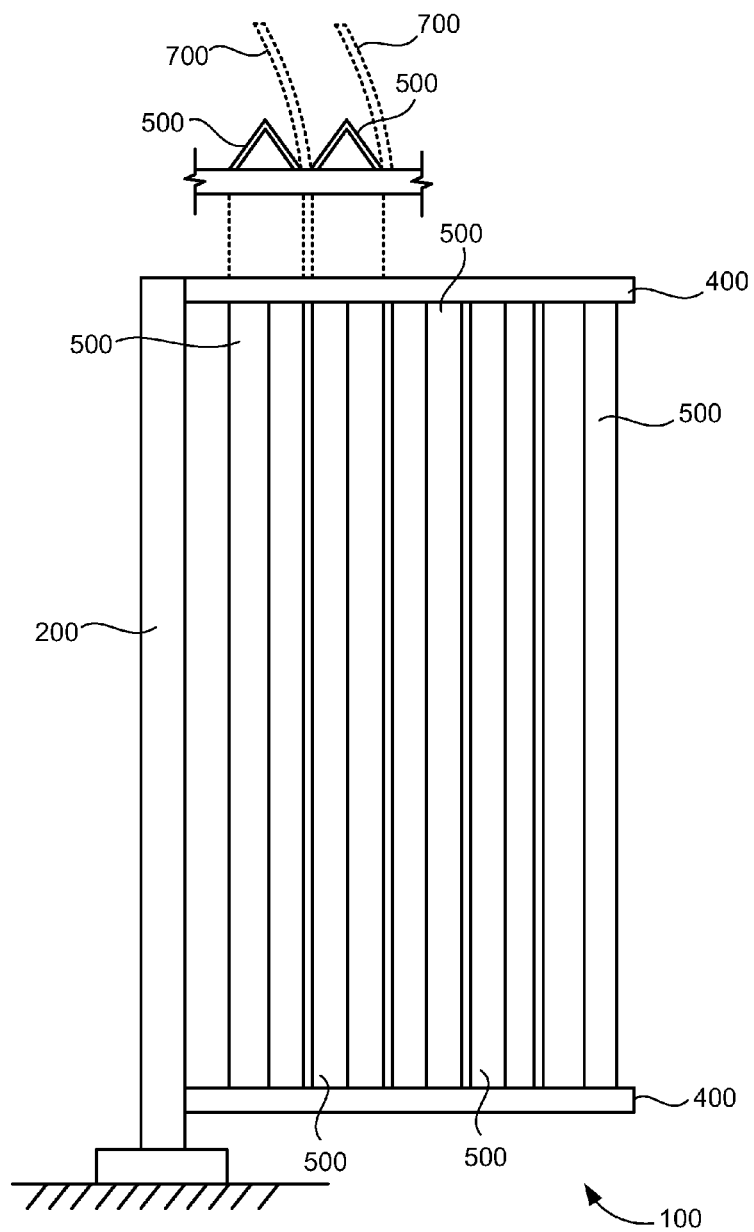
FIG. 5 is a schematic elevation view thereof showing one frame assembly and including a partial plan view.

FIG. 4 is a simple schematic showing a top plan view of a driving portion of a further embodiment of the wind turbine which comprises a plurality of frame assemblies 100 mounted to a vertical axle 200 in spaced apart radial positions. Frame assemblies 100 may number two or more. FIG.

5 illustrates a typical one of the frame assemblies 100. Each of the frame assembly 100 has plural vertically oriented peaked screens 500 fixed between a pair of spaced apart struts 400 secured to axle 200. A flexible sheet 700 is fixedly mounted along one of its edges between struts 400 and such attachment may be by use of a rotational pivot arm 60 as previously described or by other means know to those of skill. As shown in FIG. 2, the screen 500 may be of the type made up of crisscross wire construction or may be of other structural wire fabric construction with relatively open weave to minimize wind drag by allowing the maximum amount of wind to flow through screen 500 with least resistance. As shown in FIG. 4 with wind direction as shown at the bottom of the figure, sheets 700 are forced to cover screens 500 on the frame assembly 100 directed toward three o'clock and this produces thrust for driving the axle 200 in counter-clockwise rotation. Thrust is produced in the same manner during the rotation of this frame assembly until it reaches the 12 o'clock position where by sheets 700 are stripped away from screens 500. No further thrust is produced by the frame assemblies after the 12 o'clock position until each frame assembly 100 reaches approximately the 8 or 7 o'clock position depending on the shape of triangle that peaked screens 500 are formed. In the range of these positions, as shown in FIG. 4, wind W impacts sheet 700 at an oblique angle producing a counter force F, as shown, which produces positive thrust. Such positive thrust continues, as previously described until the frame assemblies reach the 12 o'clock position.

In previously designed vertical windmills, positive thrust is only able to be produced over approximately 180 degrees of rotation, while in the above described embodiment positive thrust is able to be produced over a range of about 220 degrees of rotation a very significant improvement.

Figure 6:
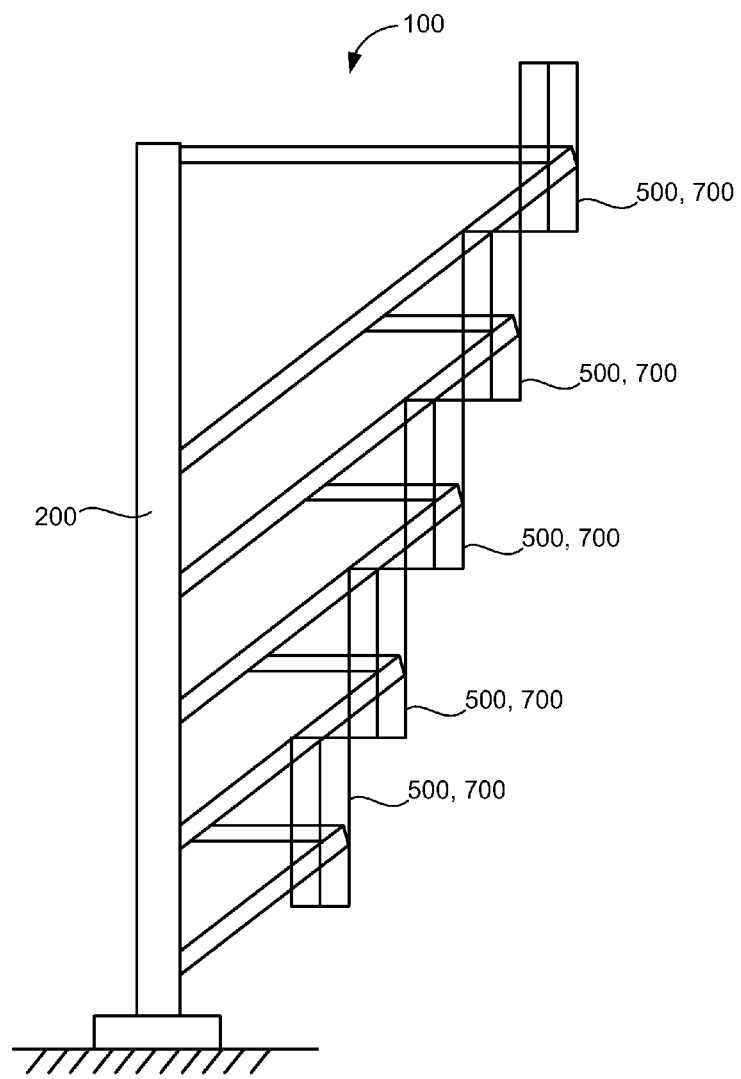
FIG. 6 is a schematic elevation view thereof showing an alternate embodiment with vertically staggered screens.

In FIG. 6 is shown a further embodiment wherein the peaked screens 500 and sheets 700 are vertically staggered so that wind shadowing does not occur.

A number of embodiments have been described herein. Nevertheless, it will be understood that various modifications may be made without departing from the spirit and scope of this disclosure. Accordingly, other embodiments are within the scope of the following claims.

What is claimed is:
1. A wind vane assembly comprising:
   a plurality of frames, each one of said frames fixed to and extending from a vertical axle in a radial direction;
   each said frame having:
      vertically spaced apart struts extending in the radial direction;
      plural V-shaped screens extending between said struts, said V-shaped screens in side-by-side positions sequenced in the radial direction;
      plural flexible sheets extending between said struts, said flexible sheets in side-by-side positions sequenced in the radial direction;
      each one of said flexible sheets fixed along a vertical edge thereof on one side of one said V-shaped screens, said flexible sheets free to move away from said V-shaped screens and to cover said V-shaped screens depending on a wind direction.
2. The wind vane assembly of claim 1 wherein said flexible sheets are secured to said frames by rotational pivot arms wherein said flexible sheets are easily rotated away from said V-shaped screens and easily rotated over said V-shaped screens.
3. The wind vane assembly of claim 1 wherein said V-shaped screens are of open weave crisscross wire construction wherein wind resistance of said V-shaped screens is minimized.

* * * * *